United States Patent Office 3,116,405
Patented Dec. 31, 1963

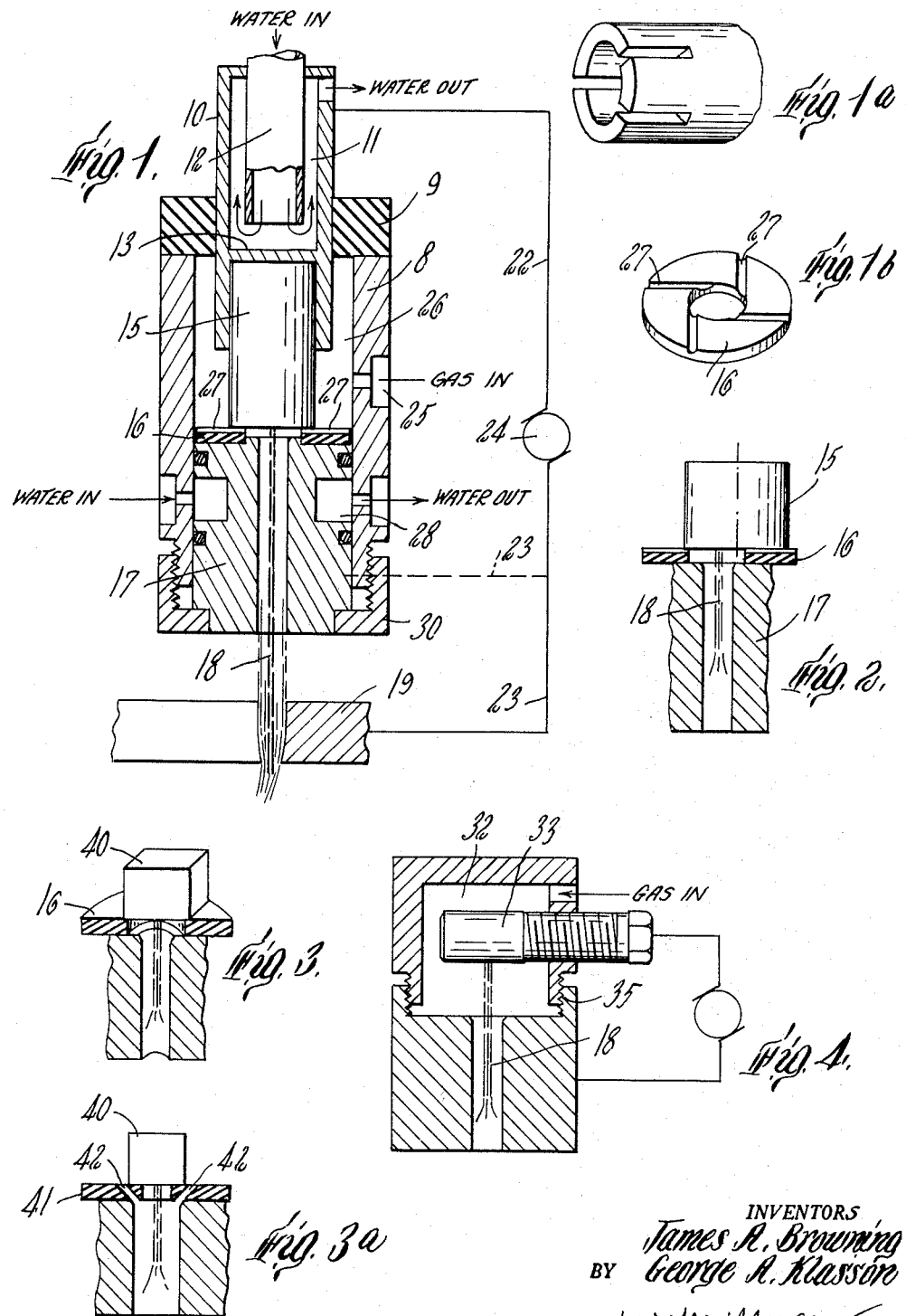

3,116,405
ELECTRIC ARC TORCHES
James A. Browning, Hanover, and George A. Klasson, Lebanon, N.H., assignors to Thermal Dynamics Corporation, a corporation of New Hampshire
Filed Mar. 23, 1961, Ser. No. 114,578
3 Claims. (Cl. 219—75)

Our invention relates to electric arc torches and relates more particularly to means whereby the life of arc torch electrodes may be significantly extended. In present arc torch devices, after normal erosion through use, electrodes must be replaced. In some cases the eroded electrode may be restored by cutting away eroded areas and reshaping to original configurations by known machining processes. In either case costly interruptions of operation are caused. Also expensive electrode material may be wasted.

It is to be understood that the essence of this invention is to make better utilization of electrode material. Such materials include refractory metals such as thoriated tungsten. These materials are expensive and, in periods of national emergency, may present a critical shortage. In accordance with the invention a simple re-positioning operation is all that is required to make the electrode arc spot function in its uneroded state.

In use, such an electrode is initially positioned with respect to the electric arc. With use there is a slow (but sometimes rapid) erosion or wearing away of the electrode material. Such erosion may be due to the fusing or chemical reaction of the electrode material by arc action. In the case of a cathode, sputtering phenomena are common. The cathode, when thermionically emitting electrons, runs with a molten surface. Such a molten surface tends to "spit" electrode material in the presence of a moving gas stream past, or over, the arcing electrode region. At the anode, erosion phenomena may again play an important role due to the high heat flux at an anode caused by electron bombardment.

After a certain period of time (which is dependent on the operating conditions and usually predictable) the initially uneroded electrode surface becomes pitted, or worn, to the point where the arc action may be adversely affected. Continued operation in many cases may lead to a major failure of the equipment. When such an adverse condition is reached in the case of conventional arc torches, the electrode is removed and replaced by a new electrode, or the eroded electrode is re-machined, if possible, to again present the original, optimum surface geometry.

Torches of the general type to which our invention is applicable are shown and described in U.S. Patent No. 2,960,594, issued to Merle L. Thorpe. In accordance with our invention, we provide electrodes for use in such torches which may be conveniently indexed or otherwise displaced to new positions relative to the electric arc path, thus presenting new, uneroded surfaces for continued, efficient torch operation.

It is accordingly the principal object of our invention to provide novel electrode constructions which permit longer usage before replacement or reworking becomes necessary.

Other objects and advantages of our invention will become apparent from the following description and accompanying drawing in which FIGURE 1 is a view in cross-section of a torch incorporating the invention;

FIGURE 1a is a view, in perspective, of a portion of the electrode holding member of the torch of FIGURE 1;

FIGURE 1b is a detailed view in perspective of one element of the torch of FIGURE 1;

FIGURE 2 is a view in cross-section of another embodiment of the invention, using a rotatable electrode;

FIGURE 3 is a view in perspective of a further modification of electrode geometry incorporating the invention;

FIGURE 3a is a view in cross-section to explain in more detail the operation of the embodiment of FIGURE 3; and FIGURE 4 illustrates a modification of the particular form of the invention shown in FIGURE 1, and using a rotatable electrode.

Referring now more particularly to FIGURE 1, we depict an arc torch apparatus having a main body 8. An insulating end piece 9 supports a double ended sleeve member 10. The member 10 contains a water chamber 11. Held in one end of the member 10 is a water inlet tube 12. Water supplied under suitable pressure flows through the tube 12 to impinge on the wall 13 which separates the two portions of the member 10. Cooling water flows as indicated by the arrows in FIGURE 1. The lower end of member 10 (as seen in the figure) is recessed to receive an electrode 15, which may be formed as a cylinder of thoriated tungsten to fit snugly in, but not affixed to, the recess in member 10. An insulating wafer 16 separates electrode 15 from a nozzle 17.

Nozzle 17 provides an arc passage as shown. The circuit is shown in the transferred mode of operation; that is, the arc 18 emerges from torch and impinges on a workpiece 19 which becomes a part of the electrical circuit completed by leads 22 and 23 and source 24. Our invention is equally applicable to the non-transferred mode of operation; that is, where the nozzle 17 becomes a true anode with the lead 23 connected to it as by the dotted line shown. In such case, of course, the arc 18 is wholly contained within the torch, only a stream of gas in the ionized and plasma states being emitted from the passage in nozzle 17.

The arc in either case is stabilized by the introduction of a suitable gas under pressure through aperture 25. The gas fills chamber 26, and flows through slots 27 in the wafer 16 (see FIGURE 1b) to create a vortex at the center of which the arc is stabilized. This construction and theory of operation are described in detail in copending application, Serial No. 56,221, filed September 15, 1960, now Patent No. 3,027,446, dated March 27, 1962.

The nozzle 17 may be cooled, if necessary, by a water jacket 28. The entire assembly is held together in coaxial relationship by a threaded nut 30, which upon tightening keeps the electrode 15 held snugly against both the wafer 16 and the wall 13 within the member 10. In addition, the recess in the lower end of the member 10 may be formed as a split collet shown in detail in FIGURE 1a. Such a construction provides effective contact between the member 10 and the electrode 15 without the necessity of controlling critical dimensions of the mating surfaces.

In the use of the torch of FIGURE 1, after a period of operation (depending on the operating parameters) the electrode 15 becomes eroded or pitted to a prohibitive extent. When this point is reached, it is merely necessary to remove the nut 30, slide out the elements 17 and 16, and turn the electrode 15 end for end. Thus a new emitting surface is presented and the torch can be immediately put back into operation. After both ends of the electrode 15 have been used and eroded, the cylinder may be replaced and both surfaces of the old electrode restored by a simple surface grinding operation to present two fresh surfaces. The shortening of the electrode is of no consequence as the resulting play may be taken up by the nut 30 upon reassembly of the unit for further use.

With the construction shown, using a flat surfaced emitting electrode, it will be seen, too, that precision centering of the electrode 15 with respect to the passage in nozzle 17 is wholly unnecessary. In torches of conventional construction, this axial orientation is most critical.

With this in mind, it will be seen that the axis of symmetry of the electrode 15 need not be aligned with the axis of the arc passage in nozzle 17. Further positive advantage of this is taken in the construction shown schematically in FIGURE 2. Here a calculated offset of the two axes is made. The exact amount of offset, while not critical, should be at least as much as the radius of the area likely to be eroded in operation. In this case, a new active surface area can be presented by merely rotating the electrode 15 the required number of degrees. This indexing procedure may be continued for 360 degrees until the usable area of the end surface is exhausted. The electrode 15 may then be turned end for end as explained above to present an entirely new end surface. As before, when both ends have been used, a simple surface grinding operation is all that is required to completely restore the electrode 15 to its original condition, although somewhat shorter. The offset shown in FIGURE 2 need only be small with respect to the slots 27 in the wafer 16. Thus the gas flow geometry and symmetry remain substantially unimpaired.

Another embodiment of our invention is shown in FIGURE 4. Here the non-transferred mode of operation is shown, although this is not necessary to the inventive concept. The arc 18 is stabilized in the position shown by a suitable gas flowing from the chamber 32, around the electrode 33, and through the arc passage in anode 34.

The electrode 33 has a threaded portion as shown which permits rotation and axial motion of the electrode with respect to the body of the device. Thus a helical path along which new active electrode areas may be presented is provided. After erosion of a given spot, it is merely necessary to rotate the electrode 33, and a new emitting area is available. After full usage, the electrode may be turned down on a lathe and used again. If spacing relative to the anode 52 becomes a critical factor in such a case, due to the reduction in diameter, the anode 34 may be moved closer to the electrode 33 by rotation on its threads 35. Thus we make effective use of the greater portion of the expensive electrode material. In this connection we should point out that the threaded portion and hexagon head on electrode 33 may be formed of less expensive materials, while the emitting end within the chamber 32 may be formed of the desired electrode material and attached, as by brazing, to the rest of the unit.

FIGURES 3 and 3a show a variation in electrode geometry adaptable for use in a torch constructed generally like the one of FIGURE 1. The electrode 15 of FIGURE 1 is replaced by a cube 40. The holding element 10 of FIGURE 1 is then constructed with a mating recess to receive a cube. Thus six separate surfaces are made available as the cube is indexed to present new uneroded active areas. A vortex pattern using the wafer of FIGURE 1b may be used. In FIGURE 3a we employ a wafer 41 having a plurality of apertures (preferably 4) around the cubical electrode 40. This construction is advantageous in providing axial rather than vortical flow. The arrangement of FIGURE 3a may be used to create laminar flow conditions as described in co-pending application Serial No. 63,019, filed October 17, 1960.

Of course other regular solid forms may be used to accomplish the purposes of our invention. Thus an octahedron will provide eight fresh surfaces before replacement of the element is required. In each case, a complementary recess is provided at the forward end of the electrode holding element 10.

While we have described and shown various modifications of our invention, further variations within the spirit and scope of the appended claims may occur to persons skilled in this art.

We claim:

1. In an electric arc torch, a first electrode assembly comprising a holder and a cylindrical electrode element held in said holder, and a second electrode in the form of a nozzle having an arc passageway extending from the end surface of said element, the axis of said element being substantially parallel to but offset a predetermined amount from the axis of said arc passageway.

2. An electrode for an electric arc torch comprising a cylindrical element disposed with its axis substantially perpendicular to an arc stream in said torch, a threaded portion extending from said element, and a torch body threadably engaging said electrode, with said element in operative position within said torch, whereby upon turning said portion successive zones along a helical path around said element are presented to said arc.

3. In an electric arc torch, an electrode assembly comprising a holder and a cylindrical electrode element held in said holder, said element being rotatably indexable in said holder and indexable end-for-end in said holder, and a nozzle forming an arc passageway extending from said element, the axis of said passageway being substantially parallel to and offset a predetermined amount from the longitudinal axis of said element.

References Cited in the file of this patent

UNITED STATES PATENTS

| 1,002,721 | Mathers | Sept. 5, 1911 |
|---|---|---|
| 2,014,226 | Catlett | Sept. 10, 1935 |
| 2,231,408 | Fechheimer et al. | Feb. 1, 1941 |
| 2,307,749 | Slepian | Jan. 12, 1943 |
| 2,842,656 | Nevvirth | July 8, 1958 |